United States Patent Office 3,395,068
Patented July 30, 1968

3,395,068
LAMINATED HEAT INSULATING PRODUCT
John P. Rex, Jr., Birmingham, Mich., assignor to Rex Roto Corporation, Walled Lake, Mich., a corporation of Michigan
No Drawing. Filed June 26, 1964, Ser. No. 378,416
7 Claims. (Cl. 161—156)

ABSTRACT OF THE DISCLOSURE

Self-supporting, laminated, fibrous combustion chamber including a relatively thin high temperature-resistant fibrous inner wall (alumina-silica) in a relatively thick, less expensive, less temperature-resistant fibrous outer wall (mineral wool, asbestos or glass fiber) including an inorganic binder (colloidal silica) permeating both walls to form an integral stable product.

---

This invention relates to a laminated insulating product and more particularly to a product comprising a plurality of different fibrous insulating materials including a relatively thin, high temperature resistant fibrous insulating material adapted for exposure to the high temperature of burning fuels or radiant heating elements as in a furnace or oven, or to high temperature molten materials as in the case of billet cores, metal molds or ladle liners, and backed up by a relatively greater wall thickness of lower cost fibrous insulating material having lower temperature resistance adequate to withstand only the lower levels of temperatures reached following temperature drop through the high temperature resistant material, and otherwise adapted to meet requirements of a composite self-supporting insulation product.

A typical insulation product employing the present laminated fibrous insulating material construction is a laminated furnace chamber for oil-fired dry base boilers wherein all of the water heating section is above the combustion chamber so that any heat transmitted through the side walls of the base is lost. The laminated chamber in this case incorporates a high temperature inner wall, constructed in accordance with prior Patent No. 3,100,734 issued Aug. 13, 1963 for "Furnance Combustion Chamber," combined with a laminated relatively lower cost thick outer layer of insulating mineral wool treated with a surface coating to protect against surface abrasion and damage in handling.

The objects of the invention and its adaptation to various insulating products will be understood from the following more detailed description of this particular laminated furnace combustion chamber and its method of manufacture by which it is vacuum cast from two different water suspended slurry systems. The first system contains a dispersion of alumina-silica fibers of the following approximate composition in water agitated to provide thorough distribution:

| | Percent |
|---|---|
| $Al_2O_3$ | 50.9 |
| $SiO_2$ | 46.8 |
| $Br_2O_3$ | 1.2 |
| $Na_2O$ | 0.8 |

A perforated screen mold in the shape of the inner chamber surface is submerged in such slurry and a vacuum is drawn through the perforated screen mold. The time of submersion and fiber concentration determining the thickness of the alumina-silica section of the chamber which may be in the order of ⅛ to ⅜ of an inch.

The second slurry system contains mineral wool fibers with a suitable binder which may be a colloid of approximately 2.3% silica solids in water in accordance with the following specification:

| | | |
|---|---|---|
| Percent colloidal silica as $SiO_2$ | | 30.0 |
| Ratio, wt., $SiO_2/Na_2O$ | | 95 |
| Chloride as NaCl | percent | 0.04 |
| Sulfate as $Na_2SO_4$ | percent | 0.05 |
| Viscosity at 25° C., cps. | | 3.6 |
| pH at 25° C. | | 9.8 |
| Surface area B.E.T. method, m. 2/g., silica | | 210 |
| Approximate particle diameter | mu | 15 |
| Turbidity | | 21 |

Stability—Stable, except toward freezing which causes irreversible precipitation. Freezing point 32° F.

The mineral wool chemical composition may be approximately as follows:

| | Percent |
|---|---|
| $SiO_2$ | 44 |
| $Al_2O_3$ | 11 |
| CaO | 29 |
| MgO | 6 |
| FeO | 10 |

A vacuum is again drawn through the perforated mold and the wet alumina-silica fiber casting before submerging in the second slurry in order to hold the first layer of alumina-silica fibers in place during submergence. The mold is kept submerged under vacuum in the second slurry long enough to lay up the desired thickness of mineral wool overlayer and the mold with the wet laminated casting is then brought out of the slurry and kept under vacuum for an additional period as required to remove excess slurry liquid. The wet casting is then removed from the mold and dried in an oven to set the colloidal silica binder which holds the fibers in the casting together. When the casting is dry a 7½% dispersion of Bentonite clay of the following composition is sprayed over the entire outer surface:

| | Percent |
|---|---|
| $SiO_2$ | 64.3 |
| $Al_2O_3$ | 21.7 |
| $Fe_2O_3$ | 3.0 |
| FeO | 0.5 |
| TiO | 0.1 |
| CaO | 0.5 |
| MgO | 2.3 |
| $Na_2O$ | 2.6 |
| $K_2O$ | 0.4 |
| S | 0.4 |

The bentonite coating is then dried to complete the manufacture of the laminated chamber.

A very thin inner layer of silica bonded alumina silica fiber has been found to be adequate to contain the combustion process and protect the mineral wool against high temperature decomposition. Such inner layer is preferably extended out of the top of the chamber and air tube opening to the outer chamber surface to hold the mineral wool in place after firing. It is adequate to employ the binder in the second slurry only since the vacuum drawing of the second slurry through the first layer results in binder impregnation of both layers. The alumina-silica fiber has a re-crystallization temperature of 2300° F. which is well above the normal hot face temperature for oil burner combustion chambers. Behind the alumina-silica inner chamber flanged top and air tube opening, the mineral wool is used as a backing insulating material. This product, although relatively larger and bulkier than the furnace combustion chamber of the aforesaid patent, is nevertheless relatively light, easy to handle, ship and install in comparison with prior refractory firebrick furnace combustion chambers and is capable of providing superior insulating properties. It will be understood that any attempt to make a complete furnace combustion chamber of such proportions entirely out of high temperature resistant alumina-silica fibers would be prohibitively expensive, while the employment of the mineral wool outer layer in thicknesses from ½ inch up to 3, 4 or more inches provides a relatively inexpensive product compared to any alternative chamber suitable for use in a dry base boiler.

The process of laying up laminations of relatively high and low temperature resistant materials may be reversed. For example, in the case of the furnace chamber described above, a female mold may be employed, inserted first in the slurry system of the relatively lower temperature mineral wool fibers, followed by insertion in the high temperature resistant slurry which, in this case, should contain the binder material. Such reversed process may be desirable where outside dimensional tolerances or outside appearance make the exterior surface of the product more critical than the inside since the surface of the product adjacent the mold will be most accurate dimensionally and smooth in appearance. Factors favoring a male mold include a cheaper, less expensive mold construction, lower production costs and those cases where interior dimensional tolerances are the more critical.

While the mineral wool described above provides an excellent relatively low cost insulating product for numerous applications, it will be understood that other substitute fibrous materials may be employed such as asbestos or glass fiber.

As a further modification of the process, cellulose pulp such as magazine paper stock may be added to the low temperature resistant slurry to provide a stronger fiber mat which may eliminate the need for the exterior clay coating or which may be used with a light coating of organic binder. Thus the clay coating, paper stock inclusion and organic binder are optional adjuncts to the main combination of laminated high and low temperature resistant fibrous materials.

While a specific furnace combustion chamber product, its method of manufacture and several modifications have been described above in detail it will be understood that numerous additional modifications and other product applications of the construction are possible without departing from the scope of the invention as defined in the following claims.

I claim:

1. A self-supporting laminated heat insulation product comprising a relatively thin wall of relatively high temperature-resistant alumina-silica fibrous refractory material and a relatively thicker wall of less costly lower temperature resistant fibrous mineral wool material having suitable heat insulating properties laminated thereto, said fibrous materials as formed into a product being held in a stable self supporting structural form by an inorganic refractory binder.

2. A product as set forth in claim 1 wherein said binder permeates both laminae.

3. A product as set forth in claim 1 including an outer surface clay coating.

4. A product as set forth in claim 1 including cellulose pulp combined with said mineral wool.

5. A product as set forth in claim 1 including cellulose pulp and an organic binder combined with said mineral wool.

6. A product as set forth in claim 1 wherein said inorganic refractory binder comprises a colloidal silica.

7. A combustion chamber product as set forth in claim 1 wherein the wall thickness of said high temperature resistant material is a small fractional part of an inch, and the wall thickness of said mineral wool material is in the order of at least a major fraction of an inch.

References Cited

UNITED STATES PATENTS

| | | | |
|---|---|---|---|
| 2,444,347 | 6/1948 | Greger et al. | 161 |
| 2,804,908 | 9/1957 | Spooner et al. | 161—205 |
| 2,987,880 | 6/1961 | Kimmel | 161—205 |
| 3,053,715 | 9/1962 | Lanino | 161—156 |
| 3,100,734 | 8/1963 | Rex et al. | 161—156 |

ROBERT F. BURNETT, *Primary Examiner.*

MORRIS SUSSMAN, *Assistant Examiner.*